United States Patent [19]
Nix et al.

[11] Patent Number: 6,101,811
[45] Date of Patent: Aug. 15, 2000

[54] QUICK CONNECT COUPLING FOR A HYDRAULIC CONTROL SYSTEM INCLUDING INTEGRAL DAMPER

[75] Inventors: Richard A. Nix, Ortonville; David C. Peterson, Walled Lake; Scott Lee Loring, Lapeer, all of Mich.

[73] Assignee: Automotive Products (USA), Inc., Auburn Hills, Mich.

[21] Appl. No.: 09/073,840

[22] Filed: May 7, 1998

[51] Int. Cl.[7] ...................................................... F15B 7/10
[52] U.S. Cl. .................................. 60/592; 60/584; 60/469
[58] Field of Search ............................ 60/584, 592, 469; 91/432, 468; 138/30, 31, 155, 109

[56] References Cited

U.S. PATENT DOCUMENTS

| | | |
|---|---|---|
| 4,454,632 | 6/1984 | Nix et al. . |
| 4,585,106 | 4/1986 | Shirley . |
| 4,609,087 | 9/1986 | Shirley . |
| 4,687,084 | 8/1987 | Leigh-Monstevens et al. . |
| 4,915,202 | 4/1990 | Leigh-Monstevens et al. . |
| 4,936,345 | 6/1990 | Nix . |
| 4,949,827 | 8/1990 | Leigh-Monstevens et al. . |
| 4,998,609 | 3/1991 | Nix et al. . |
| 5,070,983 | 12/1991 | Leigh-Monstevens et al. . |
| 5,083,433 | 1/1992 | Leigh-Monstevens . |
| 5,320,203 | 6/1994 | Wilber et al. . |
| 5,410,945 | 5/1995 | Schops et al. . |

FOREIGN PATENT DOCUMENTS

| | | |
|---|---|---|
| 0146283 | 6/1985 | European Pat. Off. . |
| 2686955 | 2/1992 | France . |
| 2736136 | 6/1995 | France . |
| 2762662 | 4/1997 | France . |
| 44 18553 A1 | 11/1996 | Germany . |
| 1 562 709 | 11/1976 | United Kingdom . |
| 2 2266 341 | 10/1993 | United Kingdom . |
| 2 306 574 | 7/1997 | United Kingdom . |
| WO 91/10839 | 7/1991 | WIPO . |
| WO 98/48212 | 10/1998 | WIPO . |

OTHER PUBLICATIONS

Two photocopies showing prior art female connector with integral bleed, manufactured by FTE GmbH, Germany.

*Primary Examiner*—Edward K. Look
*Assistant Examiner*—Thomas E. Lazo
*Attorney, Agent, or Firm*—Young & Basile, P.C.

[57] ABSTRACT

A quick connect coupling for use in a hydraulic clutch control system including a hydraulic master cylinder and a hydraulic slave cylinder. One of the coupler members of the quick connect coupling includes a central axial passage defining an inlet at one end of the passage and including a diaphragm positioned at the other end of the passage at right angles to the passage in fluid communication with fluid flowing through the passage. The passage further includes a radial passage portion communicating with the central passage and extending to a fluid port for the coupler member. Hydraulic fluid flowing through the coupler member communicates with an inboard face of the diaphragm so that the diaphragm functions to attenuate pulsations in the hydraulic fluid and preclude transmission of the pulsations rearwardly in the system to the clutch pedal.

33 Claims, 3 Drawing Sheets

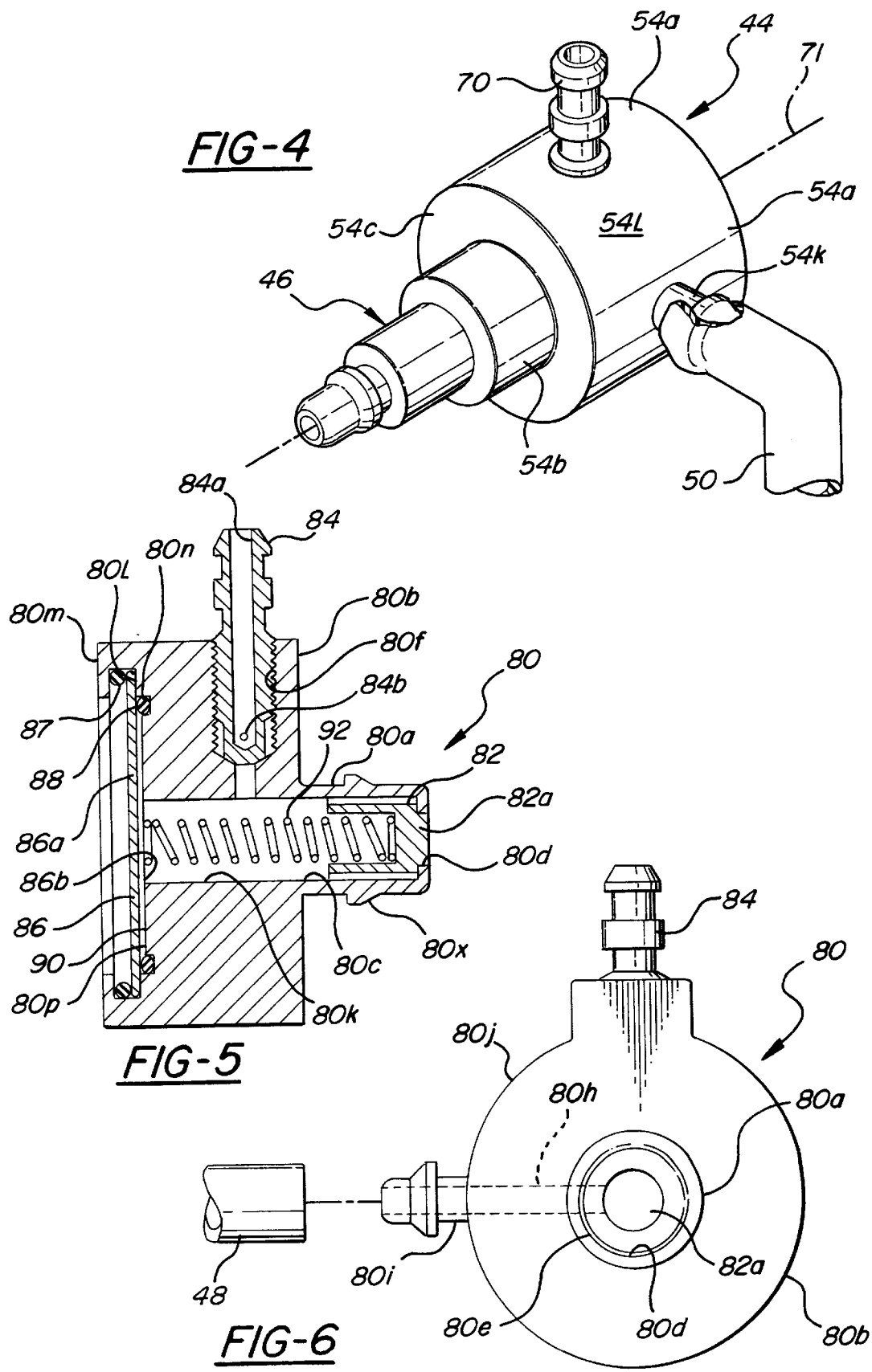

QUICK CONNECT COUPLING FOR A HYDRAULIC CONTROL SYSTEM INCLUDING INTEGRAL DAMPER

BACKGROUND OF THE INVENTION

This invention relates to hydraulic control apparatus in general and more specifically to a hydraulic control apparatus comprising a hydraulic master cylinder and a hydraulic slave cylinder for operating a mechanism remotely located from the master cylinder such for example as the clutch of a motor vehicle.

It is known to prefill with hydraulic fluid a motor vehicle clutch control apparatus comprising a master cylinder, a reservoir of hydraulic fluid, and a slave cylinder for operating the throw-out bearing of a mechanical diaphragm spring clutch, as disclosed in British patent number 1,539,879 and in corresponding U.S. Pat. Nos. 4,407,125 and 4,599,860 assigned to the assignee of the present invention. In addition, U.S. Pat. Nos. 4,503,678, 4,516,507, 4,585,106, 4,585,107, 4,585,108 and 4,585,109, all assigned to the assignee of the present invention, also disclose diverse forms of prefilled hydraulic control apparatus for motor vehicle clutches.

Prefilling with hydraulic fluid and pretesting hydraulic apparatus for operating motor vehicle mechanisms such as mechanical clutches present the many advantages for the motor vehicle manufacturer of receiving a fully assembled mechanism comprising all of the components filled with hydraulic fluid and pretested for proper operation ready to install on a motor vehicle on the assembly line without requiring that the components be installed, separately connected by way of a rigid or flexible conduits, and filled after installation with hydraulic fluid while being purged of any atmospheric air contained in the apparatus.

To simplify the installation of a hydraulic control apparatus in a motor vehicle, and particularly in situations where the apparatus employs a concentric slave cylinder as the clutch actuating device, it is known to provide the control apparatus with a one way quick connect coupling or connector either at some point of the flexible conduit connecting the master cylinder to the slave cylinder or at the end of the conduit connected to the master cylinder or at the end of the conduit connected to the slave cylinder. The one-way quick connect coupling is arranged such that after the hydraulic control apparatus has been assembled, prefilled with hydraulic fluid, and pretested, the connection between the master cylinder and slave cylinder may be broken without loss of fluid, or negligible loss of fluid. The apparatus may thus be shipped to the motor vehicle manufacturer completely filled with hydraulic fluid but in two separate modules such that the concentric slave cylinder may be made a part of the clutch bell housing, or of the transmission casing. This allows the slave cylinder clutch bell housing assembly, or the slave cylinder transmission casing assembly, to be installed in the motor vehicle at whatever station on the assembly line that the clutch or transmission is installed and the master cylinder may be installed in the motor vehicle also at whatever appropriate station and the two cylinders connected together without any loss or negligible loss of fluid and without introduction of air into the apparatus.

Whereas module systems of this type have proven to be generally satisfactory, there is still a need to provide a damper assembly in the apparatus to attenuate hydraulic pulsations in the apparatus. Specifically, imbalances in the crank shaft of the vehicle engine or engine firing impulses are transmitted to the flywheel which undergoes a swashing movement, the flywheel swashing movement in turn leads to vibrations of the spring fingers of the clutch release mechanism, the vibrations of the spring fingers are transferred to the release bearing of the clutch, and the vibrations propagate backwardly through the hydraulic fluid in the slave cylinder, through the hydraulic fluid in the conduit interconnecting the slave cylinder and the master cylinder, through the hydraulic fluid in the master cylinder, and thence through the master cylinder push-rod to the clutch pedal where they are experienced by the operator as vibrations of the clutch pedal. The propagated vibrations also generate a pedal growl which is audible to the operator as well as a clutch roar which may also be audible to the operator.

In an attempt to overcome these pulsation problems, prior art control apparatus have typically included a damper device in the apparatus. The prior art damper devices have comprised, for example, a separate mechanism positioned in the conduit interconnecting the master cylinder and the slave cylinder; a tuned mass attached to various parts of the clutch system including the clutch release lever, the slave cylinder push-rod, or the clutch pedal; a rubber damper in the master cylinder push-rod; and a rubber hose section in the conduit interconnecting the master cylinder and the slave cylinder. However, each of these prior art solutions has unduly complicated the structure and operation of the overall control apparatus and has added significantly to the cost of the control apparatus.

SUMMARY OF THE INVENTION

This invention is directed to the provision of improved hydraulic control apparatus for a motor vehicle clutch.

More specifically, this invention is directed to the provision of a hydraulic clutch control apparatus of the modular type incorporating a simplified and improved arrangement for damping hydraulic pulsations in the system.

The hydraulic control apparatus of the invention is of the type including a master cylinder having an outlet; a slave cylinder having an inlet; a conduit assembly interconnecting the outlet of the master cylinder and the inlet of the slave cylinder and including a quick connect coupling including a male coupler member and a female coupler member each including a body defining hydraulic fluid passage means extending through the member; and a damper assembly for attenuating hydraulic pulsations in the apparatus.

According to a one feature of the invention, the damper assembly includes a diaphragm positioned in the body of one of the quick connect coupler members with a face thereof in communication with the hydraulic fluid passage means in the one coupler member and with the diaphragm member mounted for attenuating movement relative to the one coupler member body in response to pulsations in hydraulic fluid in the conduit assembly. The use of a diaphragm in communication with the hydraulic fluid flowing through the coupler member provides an efficient damper function while not interfering with the fluid flow function of the coupler member.

According to a further feature of the invention, the damper assembly includes a damper member positioned in the body of the female coupler member with a face thereof in communication with the hydraulic fluid passage means in the female coupler member and with the damper member mounted for attenuating movement relative to the female coupler member body in response to pulsations in hydraulic fluid in the conduit assembly. This arrangement simplifies the provision of the damper assembly in the apparatus and minimizes the overall cost of the apparatus.

According to a further feature of the invention, the damper member comprises a diaphragm mounted in the body of the female coupler member with a face thereof communicating with the hydraulic fluid passage means in the female coupler member. This specific damper member construction further simplifies the provision of the damper assembly.

According to a further feature of the invention, the hydraulic fluid passage means in the coupler member includes a central axial passage defining a coupler member fluid inlet at one end thereof and having another end; and the diaphragm is positioned at the other end of the central axial passage. This specific packaging of the diaphragm in the coupler member further reduces the overall cost of the system.

According to a further feature of the invention, the hydraulic fluid passage means in the coupler member further includes a radial passage extending at right angles to the central axial passage, communicating at an inboard thereof with the central axial passage between the ends thereof and defining a coupler member fluid port at an outboard end thereof. This specific passage arrangement provides a simple and efficient means of routing fluid through the coupler member while allowing the coupler member to also serve as a damper for the system.

According to a further feature of the invention, the coupler member further defines a bleed system to facilitate filling and bleeding of the apparatus and the bleed system includes a bleed passage defined by the coupler member body communicating at an inboard end thereof with the hydraulic fluid passage means in the coupler member and at an outboard end thereof with atmosphere. This specific construction allows the coupler member to further serve as a bleed system for the apparatus.

In the disclosed embodiments of the invention the diaphragm is disposed at right angles to the axis of the central axial passage; an outboard face of the diaphragm defines an outer wall surface of the coupler member; the bleed passage includes a threaded bore; and the bleed system further includes a bleed screw threadably received in the threaded bore.

BRIEF DESCRIPTION OF THE DRAWINGS

FIG. 4 is a perspective view of the quick connect coupler of FIG. 2; and

FIGS. 5 and 6 are cross-sectional and end views, respectively, of an alternate form of quick connect coupling for utilization in the invention control apparatus.

DETAILED DESCRIPTION OF THE PREFERRED EMBODIMENTS

Figure 1:
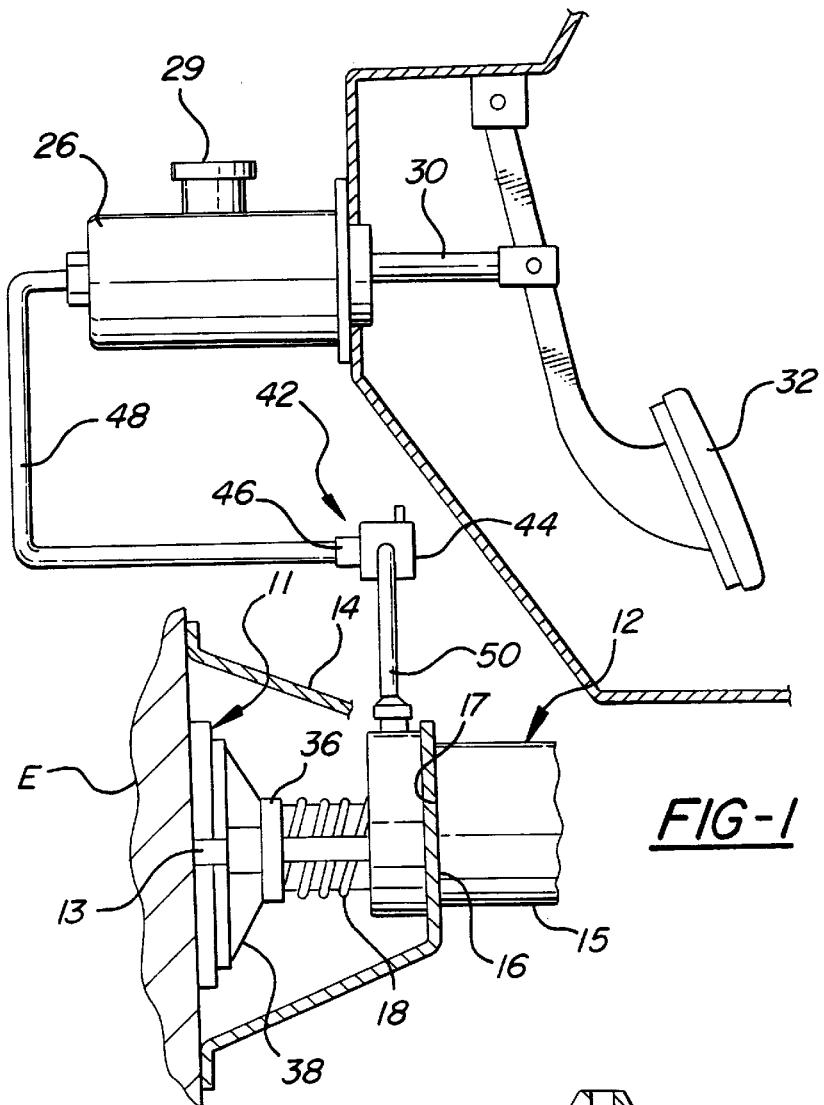
FIG. 1 is a schematic view of a motor vehicle hydraulic clutch control apparatus according to the invention.

The quick connect coupling of the invention is intended for use in association with a hydraulic clutch actuator for a motor vehicle. With reference to FIG. 1, the motor vehicle transmission is schematically illustrated as comprising a friction clutch assembly 11 and a gear box 12 enclosed in a casing or housing 15. A drive shaft 13 drives the gear box 12 from the clutch assembly 11. A bell housing 14 surrounding the clutch assembly 11 is bolted on the rear face of the motor vehicle engine E, and the rear face 16 of the bell housing 14 is bolted to the front face 17 of the gear box casing 15. An annular concentric hydraulic slave cylinder 18 is disposed around the drive shaft 13 within the bell housing 14.

Slave cylinder 18 is connected via a conduit assembly 24 to a master cylinder 26. Master cylinder 26 is provided with an integral hydraulic fluid reservoir 29 and includes an input rod 30 pivotally connected to an end of a clutch control pedal 32 installed within the drivers compartment of the motor vehicle. Rod 30 is connected in known manner to a piston disposed in the master cylinder 26 that operated to displace hydraulic fluid through conduit assembly 24 to the slave cylinder 18 when the clutch pedal is depressed.

Slave cylinder 18 is adapted in known manner to displace a throw-out bearing 36 engaged with the end of clutch release fingers 38 so that clutch 11 is released when hydraulic fluid is introduced into the slave cylinder 18 from the master cylinder 26 through the conduit assembly 24.

Conduit assembly 24 includes a quick connect coupling assembly 42 including a female coupler member 44 and a male coupler member 46; a conduit 48 interconnecting the outlet of the master cylinder 26 and the inlet of male coupler member 46; and a conduit 50 interconnecting the outlet of female coupler member 44 and a connector fitting 52 at the hydraulic inlet of the slave cylinder.

Figure 3:
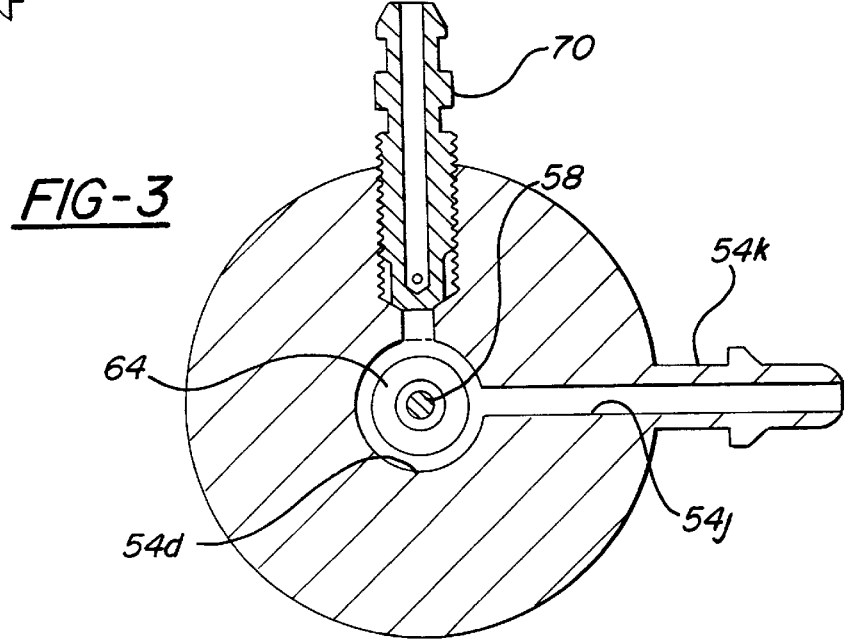
FIG. 3 is a cross-sectional view taken on line 3—3 of FIG. 2.
Figure 2:
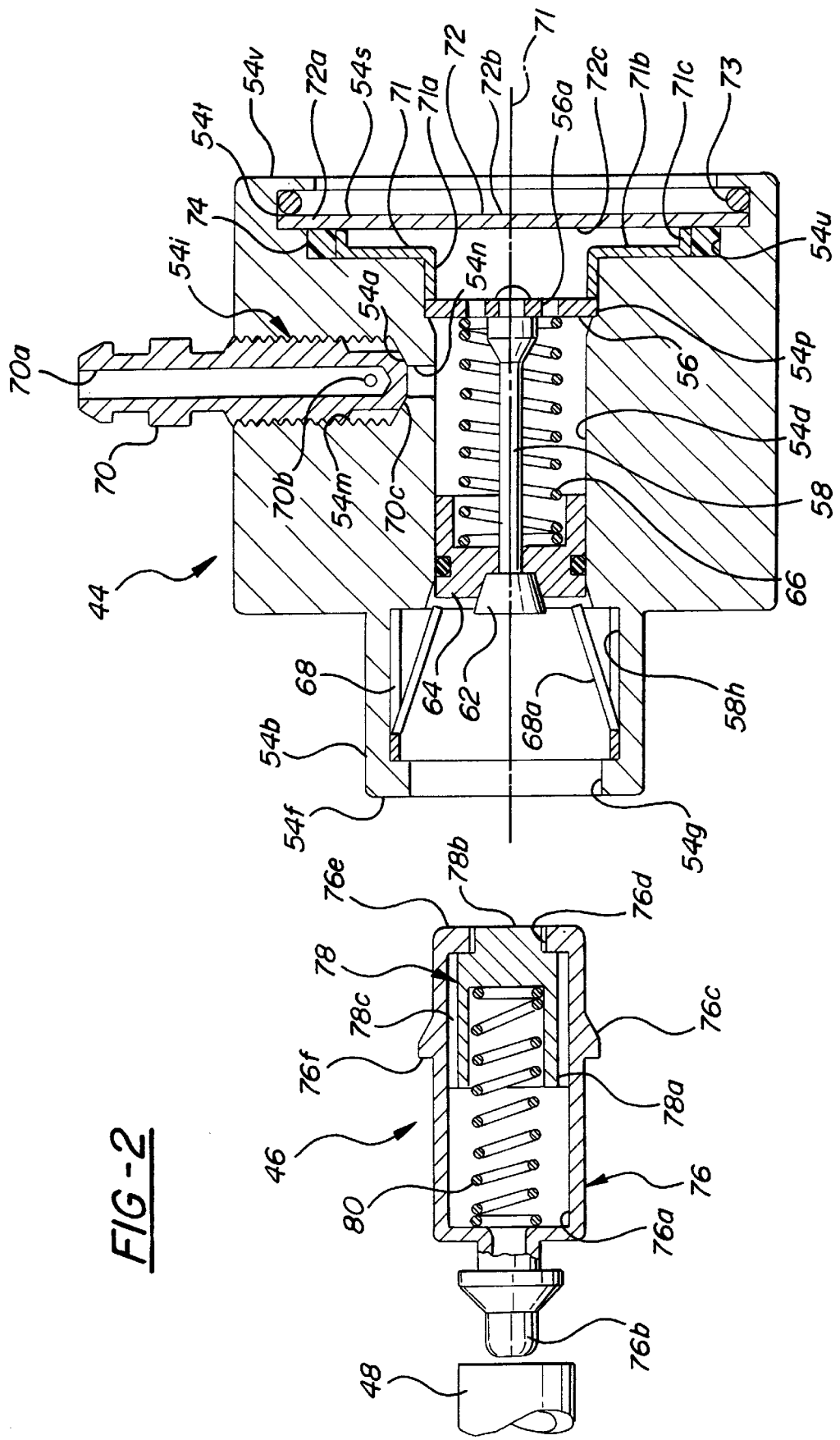
FIG. 2 is a detailed cross-sectional view of a quick connect coupler utilized in the invention control apparatus.

Female coupler member 44 (FIGS. 2, 3 and 4) has a generally circular configuration and includes a body 54; a disc 56; a valve stem 58; a valve head 62; a valve sleeve 64; a spring 66; a retainer clip 68; a bleed screw 70; a spacer 71; and a diaphragm 72.

Body 54 may be formed, for example, as a casting or forging and may be formed of an aluminum material. Body 54 includes a main body generally cylindrical portion 54a centered on axis 71 and a cylindrical entry portion 54b concentric with main body portion 54a and extending rearwardly from the rear face 54c of the main body portion. A central axial hydraulic fluid passage 54d is defined in main body portion 54a. The rear or inlet end 54f of entry portion 54b is provided with a circular opening 54g sized to pass male coupler member 46 and further defines a circular spring seat 54h sized to seat retainer clip 68 and having a diameter greater than the opening 54g and passage 54d. Body 54 further defines a radial hydraulic fluid passage 54i and a radial bleed passage 54j displaced 90 degrees from passage 54i. Radial passage 54i extends at right angles to axial passage 54d, communicates at its inboard end with passage 54d, and defines a coupler member fluid outlet fitting 54k at an outboard end thereof formed as an outward projection from the cylindrical outer surface 54l of main body portion 54a. Bleed passage 54j communicates at its inboard end with central passage 54d and opens at its outboard end in the main body outer surface 54l. Passage 54j includes a threaded outboard portion 54m opening in outer face 54l and a reduced diameter port portion 54n communicating with the inboard end of portion 54m and opening in central bore 54d.

Disc 56 has a perforated circular configuration and is fixedly positioned at right angles to axis 71 against an annular shoulder 54p formed proximate the front end of central passage 54d.

Valve stem 58 is fixedly secured at one end 58a to the center of disc 56 and extends axially rearwardly within fluid passage 54d.

Valve head 62 is fixedly secured to the upstream free end 58b of stem 58 for coaction with valve sleeve 64, which is slidably and sealingly received in bore 54d and biased into a closed position with respect to valve head 62 by coil spring 66 positioned between disc 56 and sleeve 64.

Retainer clip 68 is positioned in seat 54h and includes a plurality of circumferentially spaced spring fingers 68a for locking coaction with the male coupler member. Retainer clip 68 may, for example, be of the type disclosed in U.S. Pat. No. 4,936,345 assigned to the assignee of the present invention.

Bleed screw 70 is threadably received in threaded bore 54m and includes a central bleed passage 70a communicating with port 54n via a bleed screw port 70b in a reduced diameter inboard end of the screw when the bleed screw is unscrewed to lift the conical seat 70c of the screw off of the conical seat 54q defined by the body 54 at the juncture of threaded bore 54m and port 54n.

Spacer 71 has an annular configuration and includes a hollow central hub portion 71a and a flange portion 71b. Hub portion 71a is positioned in a bore 54r formed in body 54 forwardly of shoulder 54p and flange portion 71b is positioned against an annular shoulder surface 54s extending radially outwardly from bore 54r. Spacer 71 further includes an annular lip portion 71d extending forwardly from the outer periphery of flange portion 71b.

Diaphragm 72 is formed of a suitable spring steel material and has a generally circular configuration. For example, diaphragm 72 may be formed of shot peened spring steel having a thickness of between 1.2 and 1.6 millimeters. The outer periphery 72a of the diaphragm is pressed against an annular shoulder 54t formed by body 54 forwardly and radially outwardly of shoulder 54s and connected to shoulder 54s by a bore portion 54u. Diaphragm 72 is held against shoulder 54t by a rolled over body lip portion 54v engaging a split wire ring 73 and pressing the wire ring against the outboard face 72b of the diaphragm to press the diaphragm against shoulder 54t. A square-cut elastomeric ring 74 is positioned against the inboard face 72c of diaphragm 72 within bore 54u and outboard of spacer lip 71c. Elastomeric ring 74 is sized such that it is compressed in response to seating of diaphragm outer portion 72a against shoulder 54t by the rolled over body portion 54v bearing against split wire ring 73. Diaphragm 72 also engages lip 71c of spacer 71 to press flange portion 71b against shoulder 54s and press hub portion 71a against the disc 56 to maintain the disc in a fixed position against shoulder 54p. It will be seen that the outboard face 72b of the diaphragm forms an outer forward end wall surface of the main body portion 54a of the female coupler member and the inboard face 72c of the diaphragm is in fluid communication via disc perforations 56a with hydraulic fluid moving through the hydraulic fluid passage means defined in the female coupler member by axial passage 54d and radial passage 54i.

Male coupler member 46 has a generally cylindrical configuration and includes a body 76, a valve member 78, and a spring 80. Body 76 may be formed of an aluminum material in a casting or forging operation. Body 76 defines a central cylindrical passage 76a, a fitting 76b at the inlet end of the coupler member for coaction with conduit 48, and an external annular ridge 76c for coaction with retainer clip spring fingers 68a in response to insertion of the male coupler member into the female coupler member.

Valve member 78 includes a main body portion 78a slidably received in bore 76a and a nose portion 78b positioned in a circular opening 76d defined within the annulus 78e at the outlet end of the coupler member. Nose portion 78b has a cross-sectional configuration corresponding generally to the cross-sectional configuration of valve head 62.

Spring 80 functions to maintain valve member 78 in a closed position in which the outlet end of passage 78a is closed. Circumferentially spaced axial grooves 78c in the outer periphery of valve member 78 allow the passage of hydraulic fluid through the male coupler member when valve member 78 is moved to an open position.

It will be understood that, in the assembly of the invention control apparatus, a module comprising the female coupler member 44 (with bleed screw 70 in a closed position), the conduit 50, and the slave cylinder 18 is evacuated and filled with a suitable hydraulic fluid; a separate module comprising the male coupler member 46, the conduit 48, and the master cylinder 26 is evacuated and filled with hydraulic fluid; the modules are delivered as two separate prefilled modules to the motor vehicle manufacturer; the master cylinder module is installed in the vehicle at a convenient location on the vehicle assembly line; the slave cylinder module is installed on the vehicle at a convenient location on the vehicle assembly line; and the male coupler member 46 is inserted into the female coupler member 44 to move the valve mechanisms in both the male and female coupler members to an open position and provide fluid communication between central passage 76a and central passage 54d.

Specifically, as the male member is inserted into the female member the annulus 76e of the male member engages valve sleeve 64 and moves the valve sleeve 64 away from valve head 62 to open passage 54d while valve head 62 engages nose 78b of valve member 78 to move the valve member away from the valve seat defined by the coaction of valve member 78 and opening 76d and open up passage 76a via axial grooves 78c so that a continuous fluid passage is now established through the coupled coupler members extending from fitting 76b to fitting 54k. As the male member arrives at its coupled position within the female member, spring fingers 68a engage the annular shoulder 76f defined by ridge 76c to lock the male member in its inserted position and preclude inadvertent withdrawal of the male member from the female member.

The control apparatus now functions normally in response to depression of the vehicle clutch pedal to deliver pressurized fluid from the master cylinder to the slave cylinder and actuate the vehicle clutch in known manner. Diaphragm 72 functions to attenuate hydraulic fluid vibrations or pulsations transmitted from the crankshaft to the clutch pedal to eliminate or minimize vibrations experienced by the operator at the clutch pedal as well as minimize or eliminate pedal growl and clutch roar. In the event that field maintenance is required, bleed screw 70 may be selectively turned in an unscrewing manner to open a passage through port 54n, port 70b, and passage 70a to the atmosphere to allow hydraulic fluid to be added to the system or removed from the system as required to perform the field maintenance, whereafter the bleed screw is moved in a tightening direction to reseat the bleed screw nose 70c on the seat 54q and return the control apparatus to a sealed, normal operating condition.

In the alternate form of quick connect couplings seen in FIGS. 5 and 6, the damper function and the bleed function are incorporated in the male coupler member and the female coupler member has a standard configuration.

The male coupler member 80, as seen in FIGS. 5 and 6, includes a cylindrical main body portion 80a and an enlarged flange portion 80b. Main body portion 80a defines an annular ridge 80x for coaction with the spring fingers of the retainer clip carried by the female member in response to insertion of the male coupler member into the female coupler member. A central axial passage 80c in main body portion 80a slidaby receives a valve member 82 which includes a nose portion 82a coacting with a port 80d defined between an annulus 80e to selectively open and close port 80d. A radial bleed passage 80f in flange portion 80b communicates at its inboard end with central passage 80c and communicates at its outboard end with atmosphere. A bleed screw 84, corresponding to bleed screw 70 of the FIGS. 1–4 embodiment, is threadably received in bleed passage 80f and includes a central bore 84a and port 80b for coaction with a port 80g, forming a part of the bleed passage, to allow communication between passage 80c and atmosphere in response to unscrewing movement of the bleed screw 84.

Flange portion 80b defines a further radial passage 80h, displaced 90 degrees with respect to radial passage 80f, opening at its inboard end in passage 80c and defining a coupler member fluid fitting 80i at an outer end thereof formed as an outward projection from the cylindrical outer surface 80j of flange portion 80b and sized to receive conduit 48 so as to receive pressurized hydraulic fluid from master cylinder 26.

A diaphragm 86, corresponding to diaphragm 72 of the FIGS. 1–4 embodiment, is positioned against the open end 80k of passage 80c, remote from valve 82, in a position extending at right angles to the central axis of passage 80c.

Diaphragm 86 is maintained in position against an annular shoulder 80l, formed on the outboard face of flange portion 80b, by a split wire ring 87 positioned between a rolled over lip 80m of the flange portion and the outboard face 86a of diaphragm 86.

A square cut elastomeric ring seal 88 is positioned in a groove 80n in the flange portion and bears against the inboard face 86b of the diaphragm. Elastomeric ring seal 88 is sized such that it is compressed in response to seating of the diaphragm outer peripheral portion against shoulder 80l by rolled over lip 80m bearing against split wire ring 87.

A space 90 is maintained between the outboard face 80p of the flange portion and the inboard face 86b of the diaphragm so as to allow flexing of the diaphragm in response to pulsations in the hydraulic fluid in central passage 80c.

It will be seen that the outboard face 86a of the diaphragm forms an outboard end wall surface of the male coupler member and the inboard face 84b of a diaphragm is in fluid communication with hydraulic fluid moving through the hydraulic fluid passage means defined in the male coupler member by radial passage 80h and axial passage 80c.

A coil spring 92 is positioned in bore 80c and extends between valve 82 and the inboard face 86b of diaphragm 86. Spring 92 controls the opening and closing movement of valve 82 and is sized to selectively modify the natural frequency of vibration of the diaphragm to provide a desired attenuating reaction to pulsations in the system.

As with diaphragm 72 of the FIGS. 1–4 embodiment, diaphragm 86 functions to attenuate hydraulic fluid vibrations or pulsations transmitted from the vehicle crankshaft to the vehicle clutch pedal to eliminate or minimize vibrations experienced by the operator at the clutch pedal as well as minimize or eliminate pedal growl and clutch roar. In the event that field maintenance is required, bleed screw 84 may be selectively turned in an unscrewing manner to open a passage through port 80g, port 84b and central bore 84a to the atmosphere to allow hydraulic fluid to be added to the system or removed from the system as required to perform the field maintenance, whereafter the bleed screw is moved in a tightening direction to reseat the bleed screw and return the control apparatus to a sealed normal operating condition.

The invention will be seen to simplify the construction of the clutch control apparatus by incorporating the damper function in one of the coupler members of the quick connect coupling and by further incorporating the bleed function in the coupler member.

Whereas preferred embodiments of the invention has been illustrated and described in detail, it will be apparent that various changes may be made in the disclosed embodiments without departing from the scope or spirit of the invention.

We claim:

1. A hydraulic control apparatus including a master cylinder having an outlet; a slave cylinder having an inlet; a conduit assembly interconnecting the outlet of the master cylinder and the inlet of the slave cylinder and including a quick connect coupling including a male coupler member and a female coupler member each including a body defining hydraulic fluid passage means extending through the member; and a damper assembly for attenuating hydraulic pulsations in the apparatus, characterized in that:

the damper assembly includes a damper member positioned in the body of said female coupler member with a face thereof in communication with the hydraulic fluid passage means in said female coupler member and with the damper member mounted for attenuating movement relative to the said female coupler member body in response to pulsations in hydraulic fluid in the conduit assembly.

2. A hydraulic control apparatus according to claim 1 wherein said damper member comprises a diaphragm mounted in the body of the female coupler member with a face thereof communicating with the hydraulic fluid passage means in the female coupler member.

3. A hydraulic control apparatus according to claim 2 wherein:

the hydraulic fluid passage means in said female coupler member includes a central axial passage defining a coupler member fluid inlet at one end thereof and having another end; and the diaphragm is positioned at the other end of the central axial passage.

4. A hydraulic control apparatus according to claim 3 wherein another face of the diaphragm defines an outer wall surface of said female coupler member.

5. A hydraulic control apparatus according to claim 3 wherein the diaphragm is disposed at right angles to the axis of the central axial passage.

6. A hydraulic control apparatus according to claim 5 wherein the hydraulic fluid passage means in said female coupler member further includes a radial passage extending at right angles to the central axial passage, communicating at an inboard end thereof with the central axial passage between the inlet end thereof and the diaphragm, and defining a female coupler member fluid outlet at an outboard end thereof.

7. A hydraulic control apparatus according to claim 1 wherein:

said female coupler member further defines a bleed system to facilitate filling and bleeding of the apparatus; and the bleed system includes a bleed passage defined by the female coupler body communicating at an inboard end thereof with the hydraulic fluid passage means in the female coupler member and at an outboard end thereof with atmosphere.

8. A hydraulic control apparatus according to claim 7 wherein the bleed passage includes a threaded bore and the bleed system further includes a bleed screw threadably received in the threaded bore.

9. A hydraulic control apparatus including a master cylinder having an outlet; a slave cylinder having an inlet; a conduit assembly interconnecting the outlet of the master cylinder and the inlet of the slave cylinder and including a quick connect coupling including a male coupler member and a female coupler member each including a body defining hydraulic fluid passage means extending therethrough; and a damper assembly for attenuating hydraulic pulsations in the apparatus, characterized in that:

the damper assembly includes a diaphragm positioned in the body of one of said quick connect coupler members with a face thereof in communication with the hydraulic fluid passage means in said one member and with the diaphragm mounted for attenuating movement relative to the one coupler member body in response to pulsations in hydraulic fluid in the conduit assembly.

10. A hydraulic control apparatus according to claim 9 wherein:

the hydraulic fluid passage means in said one coupler member includes a central axial passage defining a coupler member fluid inlet at one end thereof and having another end; and the diaphragm is positioned at the other end of the central axial passage.

11. A hydraulic control apparatus according to claim 10 wherein another face of the diaphragm defines an outer wall surface of said one coupler member.

12. A hydraulic control apparatus according to claim 10 wherein the diaphragm is disposed at right angles to the axis of the central axial passage.

13. A hydraulic control apparatus according to claim 12 wherein the hydraulic fluid passage means in said one coupler member further includes a radial passage extending at right angles to the central axial passage, communicating at an inboard end thereof with the central axial passage inboard of the diaphragm, and defining a coupler member fluid outlet at an outboard end thereof.

14. A hydraulic control apparatus according to claim 13 wherein the bleed passage includes a threaded bore and the bleed system further includes a bleed screw threadably received in the threaded bore.

15. A hydraulic control apparatus according to claim 13 wherein the one coupler member comprises the female coupler member.

16. A hydraulic control apparatus according to claim 13 wherein the one coupler member comprised the male coupler member.

17. A hydraulic control apparatus including a master cylinder having an outlet; a slave cylinder having an inlet; a conduit assembly interconnecting the outlet of the master cylinder and the inlet of the slave cylinder and including a quick connect coupling including a male coupler member and a female coupler member each including a body defining hydraulic fluid passage means extending therethrough and each including a valve mechanism positioned in the respective fluid passage means, means normally maintaining the respective valve mechanism in a closed position closing the respective fluid passage means, and means operative in response to coupling of the male and female coupler members to move the valve mechanisms to an open position allowing passage of hydraulic fluid through the conduit assembly from the master cylinder outlet to the slave cylinder inlet; and a damper assembly for attenuating hydraulic pulsations in the apparatus, characterized in that:

the damper assembly includes a damper member positioned in the body of one of said quick connect coupler members with a face thereof in communication with the hydraulic fluid passage means in said one member and with the damper member mounted for attenuating movement relative to the one coupler member body in response to pulsations in hydraulic fluid in the conduit assembly.

18. A hydraulic control apparatus according to claim 17 wherein said damper member comprises a diaphragm mounted in the body of said one coupler member with a face thereof in communication with the hydraulic fluid passage means in said one member.

19. A hydraulic control apparatus according to claim 18 wherein:

the hydraulic fluid passage means in said one coupler member includes a central axial passage defining a coupler member fluid port at one end thereof and having another end; and the diaphragm is positioned at the other end of the central axial passage.

20. A hydraulic control apparatus according to claim 19 wherein another face of the diaphragm defines an outer wall surface of said one coupler member.

21. A hydraulic control apparatus according to claim 19 wherein the diaphragm is disposed at right angle to the axis of the central axial passage.

22. A hydraulic control apparatus according to claim 21 wherein the hydraulic fluid passage means in said one coupler member further includes a radial passage extending at right angles to the central axial passage, communicating at an inboard end thereof with the central axial passage between the fluid port thereof and the diaphragm, and defining a further coupler member fluid port at an outboard end thereof.

23. A hydraulic control apparatus according to claim 22 wherein the one coupler member comprises the female coupler member.

24. A hydraulic control apparatus according to claim 22 wherein the one coupler member comprises the male coupler member.

25. A hydraulic control apparatus according to claim 17 wherein:

said one coupler member further defines a bleed system to facilitate filling and bleeding of the apparatus; and the bleed system includes a bleed passage defined by the body of said one coupler member communicating at an inboard end thereof with the hydraulic fluid passage means in said one member and at an outboard end thereof with atmosphere.

26. A hydraulic control apparatus according to claim 25 wherein the bleed passage includes a threaded bore and the bleed system further includes a bleed screw threadably received in the threaded bore.

27. A hydraulic control apparatus according to claim 17 wherein:

said one coupler member comprises the female coupler member;

the body of the female coupler member defines an axial passage extending through the body from one end face of the body to an opposite end face of the body and defining a portion of the female coupler member fluid passage means;

said one end face defines a fluid inlet for the female coupler member including an opening sized to receive the male coupler member; and the diaphragm is positioned proximate the opposite end face of the body at right angles to the axis of the axial passage.

28. A hydraulic control apparatus according to claim 27 wherein:
- the female coupler member includes a disc positioned in the axial passage proximate the opposite end face of the body and inboard of the diaphragm; and
- the disc is perforated to allow fluid in the axial passage to act against an inboard face of the diaphragm.

29. A hydraulic control apparatus according to claim 28 wherein the valve mechanism of the female coupler member includes a stem fixedly secured to the disc and extending in the axial passage toward the fluid inlet of the female coupler member, a valve head defined on a free end of the stem, and a valve sleeve slidably mounted in the axial passage between the disc and the valve head and coacting with the valve head to define the open and closed positions of the valve member.

30. A hydraulic control apparatus according to claim 29 wherein an outboard face of the diaphragm defines an outer wall surface of the female coupler member.

31. A hydraulic control apparatus according to claim 30 wherein the hydraulic fluid passage means in said female coupler member further includes a radial passage extending at right angles to the axial passage, communicating at an inboard end thereof with the axial passage between the valve head and the disc, and defining a female coupler member fluid outlet at an outboard end thereof.

32. A hydraulic control apparatus according to claim 31 wherein:
- the female coupler member further defines a bleed system to facilitate filling and bleeding of the apparatus; and
- the bleed system includes a bleed passage defined by the body of said female coupler member communicating at an inboard end thereof with the axial passage and at an outboard end thereof with atmosphere.

33. A hydraulic control apparatus according to claim 32 wherein the bleed passage includes a threaded bore and the bleed system further includes a bleed screw threadably received within the threaded bore.

\* \* \* \* \*